United States Patent [19]

Gramlich

[11] 4,136,541
[45] Jan. 30, 1979

[54] TAMPER PROOF LOCKING DEVICE FOR FUEL OIL METERS AND THE LIKE

[75] Inventor: Lawrence R. Gramlich, Edgewater Park, N.J.

[73] Assignee: F. C. Haab Co., Inc., Philadelphia, Pa.

[21] Appl. No.: 853,820

[22] Filed: Nov. 22, 1977

[51] Int. Cl.² .......................................... F16B 41/00
[52] U.S. Cl. .................................................... 70/231
[58] Field of Search ............... 70/229, 230, 231, 232, 70/259; 85/35

[56] References Cited

U.S. PATENT DOCUMENTS 3,540,245  11/1970  Pope .................................... 70/231

*Primary Examiner*—Robert L. Wolfe
*Attorney, Agent, or Firm*—Edelson and Udell

[57] ABSTRACT

A tamper-proof nut assembly for interlocking together the separable parts of a mounting support for a meter for monitoring the flow of liquid from a storage supply thereof to prevent separation of the meter from its support so that it is rendered inoperative to record and register the amount of liquid passing through the supply or delivery line with which the meter is associated, the nut assembly including an elongated tubular member having axially alined integrally formed first and second parts each externally fitted with a revoluble sleeve, one of said parts being adapted for threaded engagement with a bolt for locking together the separable parts of the meter support and the other of said parts being of a polygonal external shape for application of a tightening wrench thereto, the revoluble sleeve which encases the polygonal part of the nut member being removably held in place by a key-actuated tumbler cylinder fitted in the bore of said polygonal part of the nut member.

3 Claims, 6 Drawing Figures

TAMPER PROOF LOCKING DEVICE FOR FUEL OIL METERS AND THE LIKE

This invention relates to a device for preventing unauthorized removal or displacement of a meter for monitoring the flow of a liquid, such as fuel oil meters and the like, from its support so as to render the meter inoperative to register and/or record the amount of liquid passing through a line to which the meter is normally connected and more particularly to a tamper proof lock mechanism for maintaining the meter secured in its operative position.

Typically, the monitoring meter is held clamped in operative position between a pair of clamp members which are bolted together to provide a relatively fixed support for the meter. Normally these clamp members are secured together by nuts threaded onto the ends of studs which project from one of said clamp members through bores provided in the other member, which nuts are wired together and to the support with their ends sealed to prevent removal of the nuts to thereby permit separation of the clamp members to a degree sufficient to deactivate the meter and thus allow an unaccounted supply of the fuel oil to pass through the line through which the oil is being dispensed. But such attempts to prevent the surreptitious theft of fuel oil have generally proved to be ineffective and it is among the principal objects of the present invention to provide a key-actuated lock nut mechanism which is adapted to be applied to at least one of the bolting studs in place of the conventionally applied wire-sealed nut to insure against such tampering with the oil meter as would permit the unaccounted dispensing of fuel oil.

A further object of the present invention is to provide a nut member completely shielded by freely revoluble sleeves which cannot be unscrewed from the stud onto which it is threaded except by use of a key-actuated lock mechanism for permitting removal of the shield and application of a turning wrench directly to the exposed nut member for unscrewing it from its stud.

Other objects and advantages of the present invention will appear more fully hereinafter, it being understood that the present invention consists in the combination, construction, location and relative arrangement of parts, all as described in detail in the following specification, as shown in the accompanying drawings and as finally pointed out in the appended claims.

Figure 1:
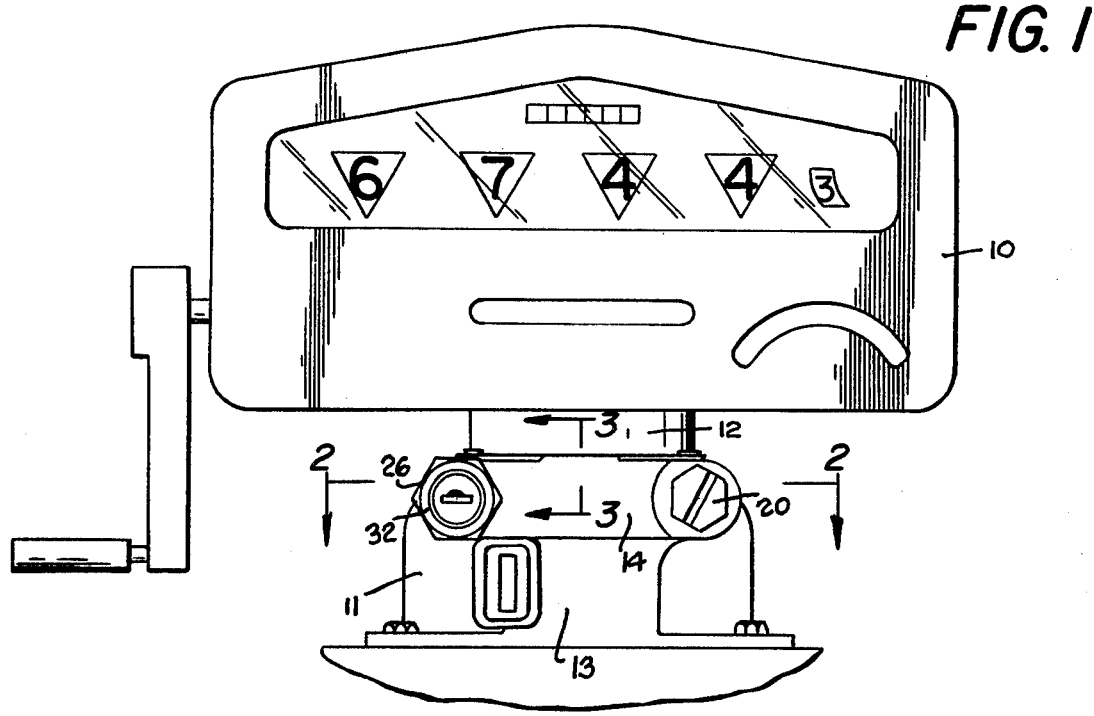
FIG. 1 is a partial front elevational view of a fuel oil meter assembly showing the normally separable parts thereof which are adapted to be secured against unauthorized separation by the tamper-proof lock mechanism of the present invention.
Figure 6:
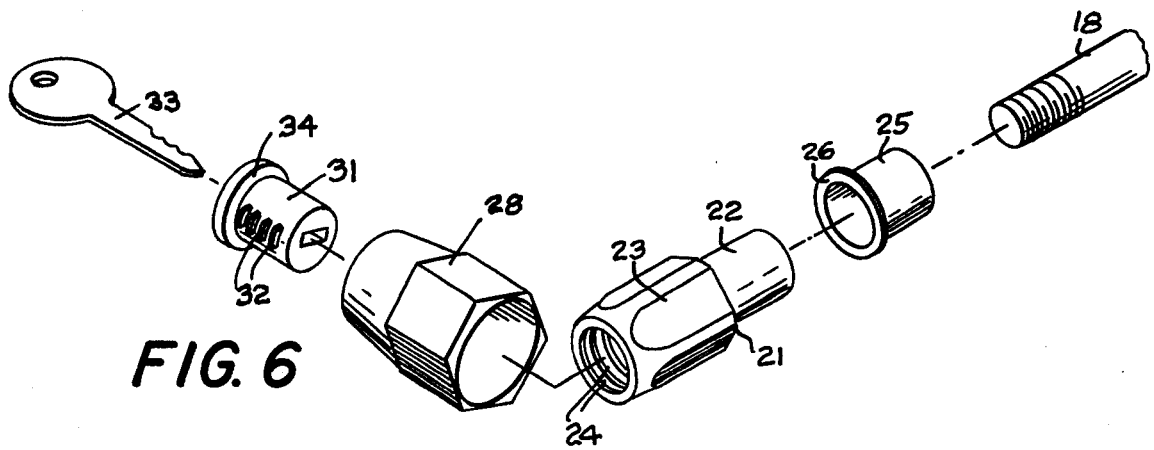
Figure 2:
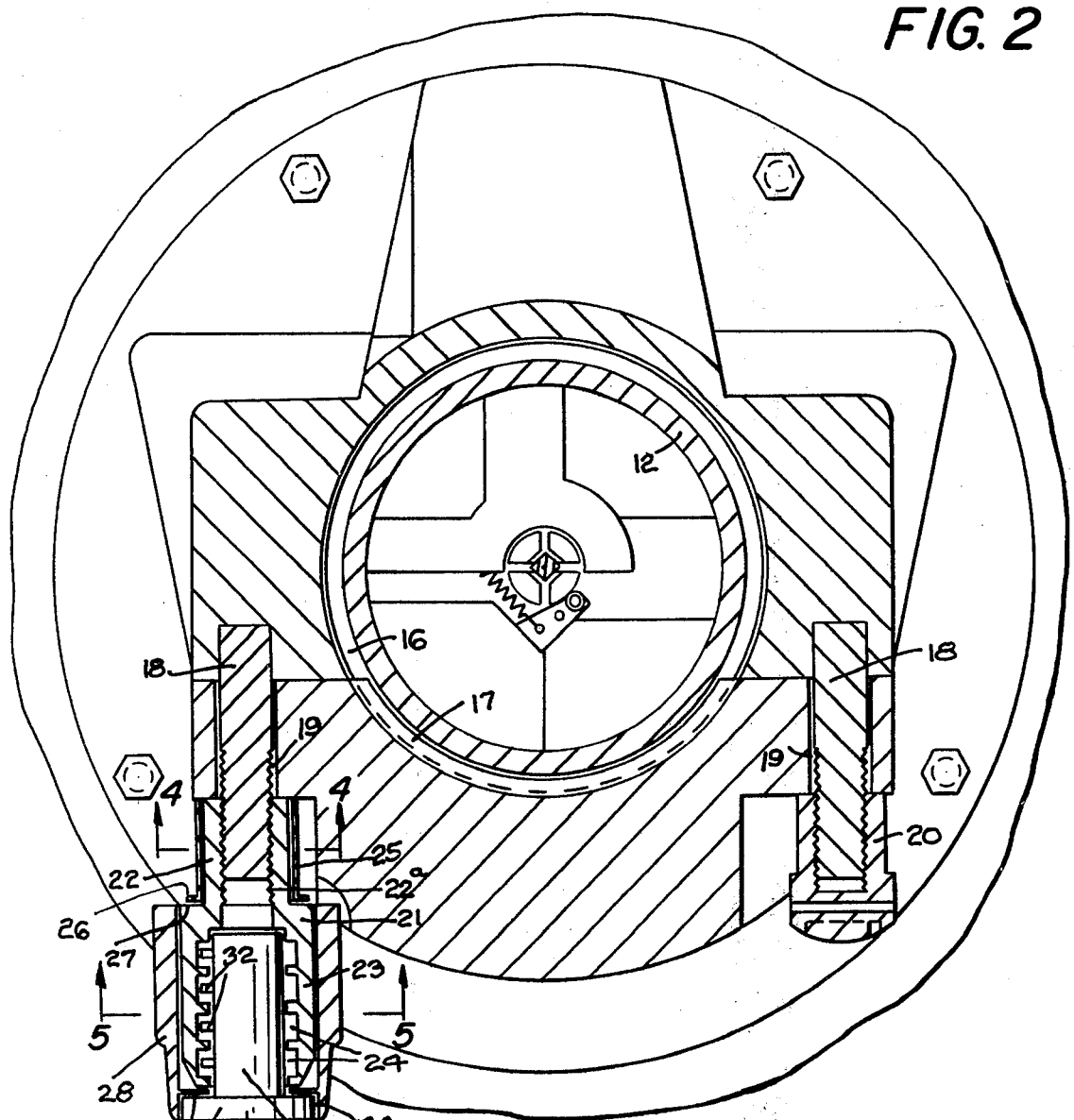
FIG. 2 is a horizontal cross-sectional view taken along the line 2—2 of FIG. 1 showing the lock mechanism in its installed condition in the meter assembly of FIG. 1.
Figure 4:
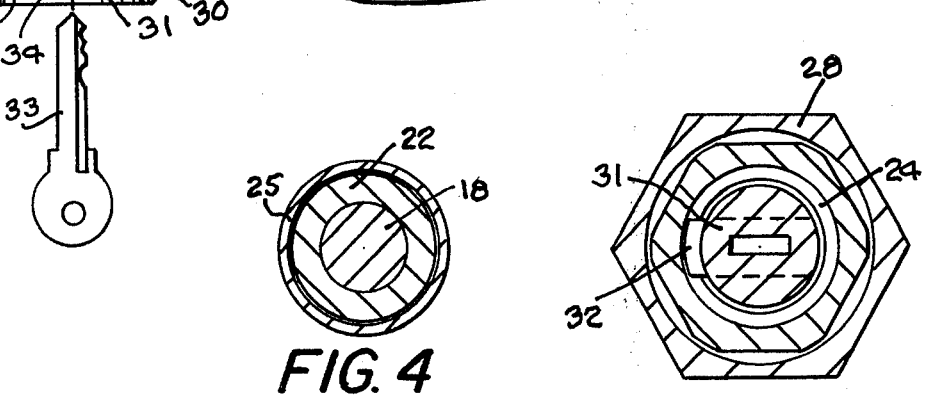
Figure 5:
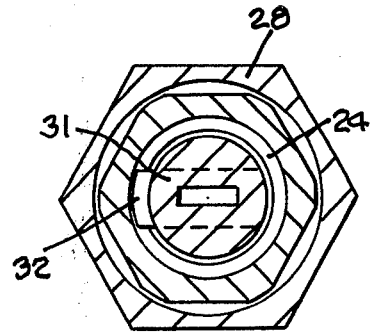

FIGS. 4 and 5 are transverse cross-sectional views of the installed anti-theft locking mechanism as respectively taken along the lines 4—4 and 5—5 of FIG. 2; and FIG. 6 is an exploded view showing in perspective the several parts of the tamper-proof lock mechanism as constructed in accordance with the present invention.

Referring now more particularly to the drawings, it will be observed that the tamper-proof lock mechanism of the present invention is shown applied to a fuel oil meter assembly in which the meter 10 as a self-contained unit is removably supported in its operative condition by a support having mating parts which are normally bolted together to clampingly embrace a depending neck portion of the meter and so prevent lifting the meter from its support to thereby render the meter inoperative to perform its intended functions.

Figure 3:
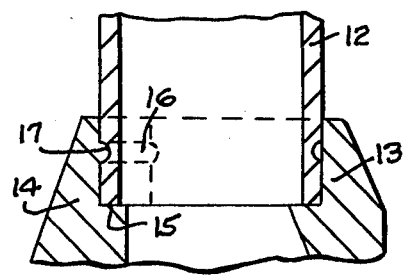
FIG. 3 is a vertical cross-sectional view of the separable parts of the fuel oil meter assembly as taken along the line 3—3 of FIG. 1.

To this end as best appears in FIGS. 2 and 3, the meter 10 is provided with a depending tubular neck part 11 which is adapted to be telescopically fitted into and embraced by the separable sections of a support collar 12 having a relatively fixed main part 13 and a radially separable part 14 which conjointly provide an annular socket having an internal shoulder or seat 15 upon which rests the bottom end of the meter neck part 11. These separable parts 13 and 14 of the meter support are provided with mating flat faces which are adapted for securement flatwise in abutting relation against one another in a common vertical plane extending chordally across the socket in which is received the neck part 11 of the meter.

The meter neck part 11 is provided with an external annular groove 16 for reception of a complementally shaped arcuate rib 17 formed on the inner surface of the radially separable part 14 of the meter support so that when the meter support parts 13 and 14 are assembled in their abutting relation as shown in FIG. 2, the rib 17 of the support part 14 fits snugly into the groove 16 of the meter neck part 16 to prevent any such vertical separation of the meter from its support as would render the meter inoperative. Since the operating mechanism of the meter forms no part of the present invention, a description thereof is not deemed necessary except to point out that upon vertically disengaging the meter from its support the meter is rendered inoperative to register and record any fuel oil passing through the line with which the meter is connected.

The separable parts 13 and 14 of the meter support collar 12 are held together in their clamped condition about the neck part 11 of the meter by means of the threaded studs 18—18 which extend from opposite side portions of the main section 13 of the support through alined bores 19—19 formed in the separable part 14 of the support collar 12 for conventional reception of securing nuts 20—20 (only one of which is shown) threaded onto the freely projecting ends of the studs.

In order to prevent unauthorized removal of these nuts 20 by a person or persons seeking to disable the meter, the anti-theft lock mechanism of the present invention is employed to replace at least one of said conventionally employed nuts. This tamper-proof lock essentially comprises an elongated nut member 21 having a first or inner end part 22 of a circular external cross-section which is axially bored and internally threaded, as at $22^a$ for threaded connection to a selected one of the studs 18 for tightly bolting together the mating parts 13 and 14 which form the meter support collar 12. Integrally formed as an outer end extension of the internally threaded part 22 of the nut member 21 is an enlarged hollow part 23 having its external surface of a generally polygonal shape to which a wrench or other tool (not shown) may be applied for tightly threading the nut member onto the stud 18.

The enlarged hollow end part 23 of the nut member is internally provided with a plurality of axially spaced parallel annular grooves 24 for a purpose which will be described hereinafter, while the reduced diameter internally threaded part 22 of the nut member 21 is externally fitted with a freely revoluble sleeve 25 which is of a length just slightly shorter than that of said threaded part 22. This sleeve 25, formed of a suitable material such as metal or the like having a structural strength sufficient to prevent crushing thereof, is further strengthened against any possibility of its being deformed into binding engagement with the part of the nut which it revoluble embraces, by a radially extending flange 26 adapted for disposition flatwise against the shouldered surface 27 formed at the point of juncture of the reduced diameter internally threaded part 22 with the enlarged internally grooved part 23 of the nut member 22.

Also, it will be noted that the opposite side portions of the separable part 14 of the meter support collar 12 are respectively right angularly recessed to provide zones of limited areas in which are disposed the outer ends of the studs 18—18 that project freely beyond the bores 19—19 of the part 14 when the latter is in its assembled position shown in FIG. 2. Due to the close proximity of the side walls of these recesses to the external surface of the sleeve 25 revolubly fitted about the internally threaded part 22 of the nut member 21 there is little room, if any, for application of a tool to the sleeve 25 for crimping the latter into binding contact with the portion of the nut member 21 which the sleeve embraces while at the same time attempting to rotate the sleeve to remove the nut member 21 from the stud to which it is tightly secured. To try to surreptitiously remove the nut member 21 by so applying a wrench or other tool to the freely revoluble sleeve 25 in an effort to bind it against and so rotate the circular surface of the nut member 21 would involve such a laborious and long drawn out procedure as would deter one from even attempting it.

The enlarged outer end part 23 of the nut member 21, i.e., the portion thereof having the wrench-engaging external surface of polygonal shape, is encased within a loose-fitting generally cylindrical freely rotatable shell or sleeve 28 having an internally formed annular flange 29 spaced inwardly from its outer end to provide the same with a circular recessed socket 30 of which the flange forms the bottom wall. The flange 29 is of a radial depth just sufficient to overlie and abut the circular rear edge of the internally grooved part 23 of the nut member. Thus, it will be apparent that when the shell 28 is slipped over the enlarged part 23 of the nut member 21, its internal end flange 29 will engage the outer edge of the part 23 to limit axial movement of the rotatable shell inwardly of said part 23 without, however, reducing the diameter of the opening into said internally grooved part 23 of the lock nut 21.

The shell or sleeve 28 is held locked in its freely revoluble position as shown in FIG. 2 by a key-actuated tumbler lock cylinder 31 having a plurality of springpressed radially shiftable tumbler elements 32 one or more of which are adapted to be selectively projected automatically into the grooves or channels 24 of the part 23 upon withdrawal of an actuating key 33 from within the cylinder 31. It will be observed as best appears in FIG. 2, that the lock cylinder is provided with a flanged end 34 which is adapted to seat within the recessed socket 30 in the free end of the shell or sleeve to thereby hold the tumbler cylinder locked in the grooved bore of the enlarged outer part 23 of the nut member 21 by interengagement of its tumbler elements within one or more of the grooves 24 as may be released upon removal of the key 33 from the tumbler cylinder.

It will be apparent that it is only when the key 33 is fully inserted into the tumbler cylinder 31 to retract the tumbler elements 32 from the annular grooves 24 of the part 23 of the nut member 21 that the cylinder may be axially withdrawn from the member 21 to permit removal of the shell 28 for application of a wrench or other such tool to the polygonally shaped external surface of the nut member for removal of the latter from the stud 18. Thus, only such personnel having authorized possession of the key 33 may remove the lock mechanism from the stud 18. Of course, so long as the inner sleeve 25 and the shell 28 remain rotatably mounted on the nut member 21 as shown in FIG. 2, application of a wrench to the polygonal end of the nut member 21 for unscrewing the same from the stud 18 is effectually precluded.

It will be understood, of course, that the present invention is susceptible of various changes and modifications which may be made from time to time without departing from the general principles or real spirit thereof, and it is accordingly intended to claim the invention broadly as well as specifically as indicated in the appended claims.

What is claimed as new and useful is:

1. In a meter assembly for monitoring the flow of liquid from a storage supply thereof of the type wherein the meter is operatively mounted upon a support assembly having separable parts clamped about a depending collar of the meter and wherein one of said parts is provided with a bolt member having a threaded end portion projecting through and beyond the other of said parts for attachment thereto of a securing nut, said other part being recessed in the region thereof immediately surrounding the freely projecting threaded end of said bolt member, in combination, a tamper-proof nut assembly including a nut member having an internally threaded tubular bolt-engaging first part adapted to be projected into said recessed region for threaded securement to said projecting end portion of said bolt and a tubular second part of enlarged diameter integral with and extending axially from said first part, said axially extending second part having a polygonally shaped external surface for application of a wrench or like nut-turning tool thereto terminating in an annular shoulder immediately adjoining said first part and being internally provided with a plurality of axially spaced parallel annular grooves or channels, a pair of first and second cylindrical sleeves respectively revolubly fitted in axially separated relation on said first and second parts of said nut member, said first cylindrical sleeve fitted on said internally threaded bolt-engaging part of said nut member being of an external diameter so substantially smaller than that of said second sleeve as to enable it to be closely confined in said recessed region of said meter support assembly whereby to effectively preclude access thereto of a crimping tool or the like for binding said first sleeve on said bolt-engaging part of said nut member, and a key-actuated tumbler cylinder removably fitted within the bore of said internally grooved part of said nut member having spring-pressed tumbler elements adapted to project into said grooves or channels automatically upon retraction of the key from said tumbler cylinder whereby to retain said second sleeve in position to freely revolve about said polygonally shaped part of said nut member.

2. In a meter assembly as defined in claim 1 wherein said sleeve which is revolubly fitted on said internally threaded first part of the nut member is provided at its outer end with a radially extending flange disposed flatwise against the shoulder of said enlarged second part of said nut member and wherein the inner end of said flanged sleeve terminates just short of the corresponding end of said internally threaded first part of said nut member whereby said latter member may be tightened onto said bolt member without restricting the free rotation of said flanged sleeve about said first part of said nut member.

3. In a meter assembly as defined in claim 1 wherein said threaded first part of said bolt-engaging nut is of a reduced external diameter not exceeding the overall external diameter of said tumbler cylinder and said first cylindrical sleeve is of a wall thickness such that when rotatably fitted upon said threaded part of said nut it may be accomodated with the latter in said recessed region of said meter support assembly.

* * * * *